Nov. 24, 1964 G. H. BINGHAM, JR 3,157,899
METHOD OF MAKING A BOOT LAST
Filed June 28, 1961 2 Sheets-Sheet 1
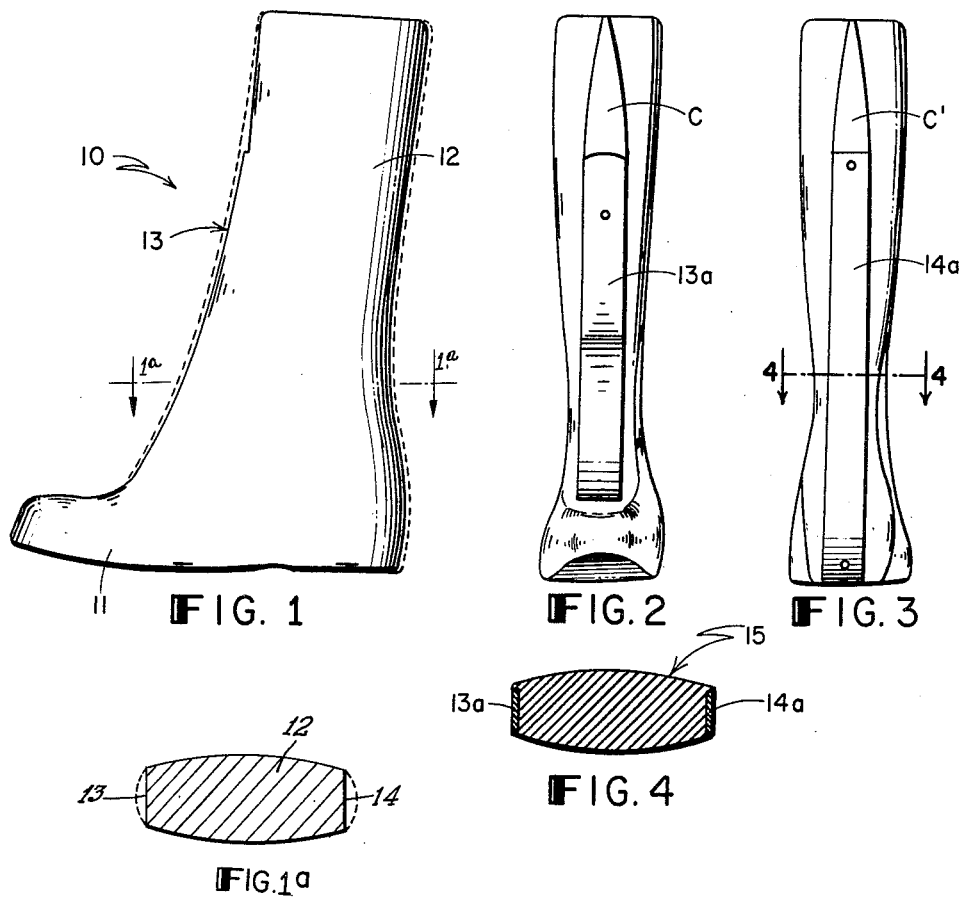
INVENTOR.
George H. Bingham, Jr.
BY
Robert Cushman + Grover
ATT'YS.

Nov. 24, 1964
G. H. BINGHAM, JR
3,157,899
METHOD OF MAKING A BOOT LAST
Filed June 28, 1961
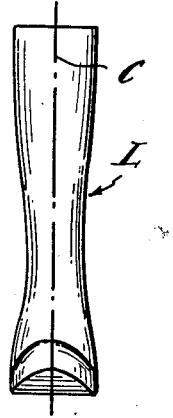
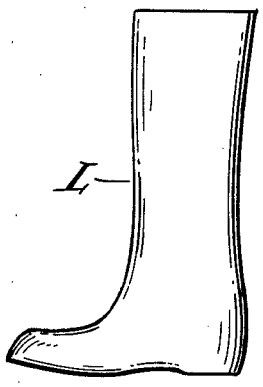
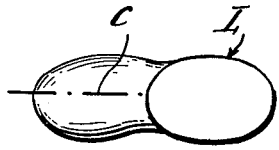
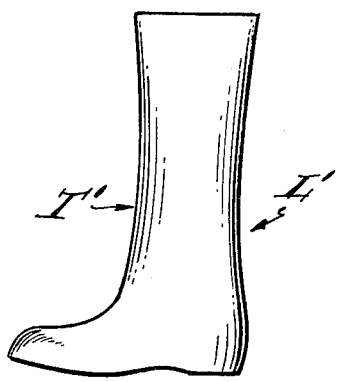
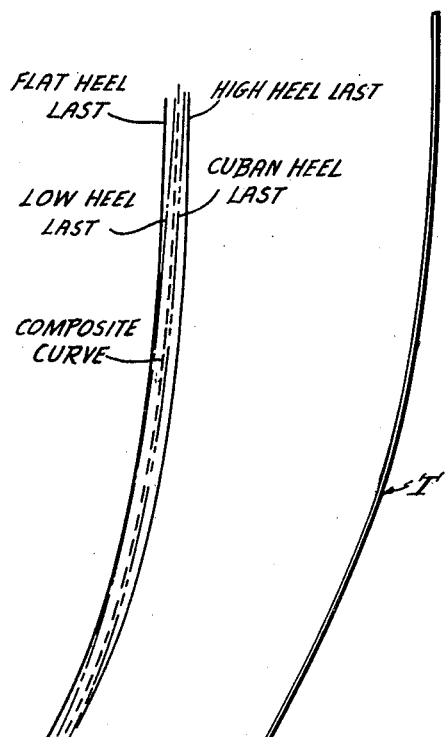
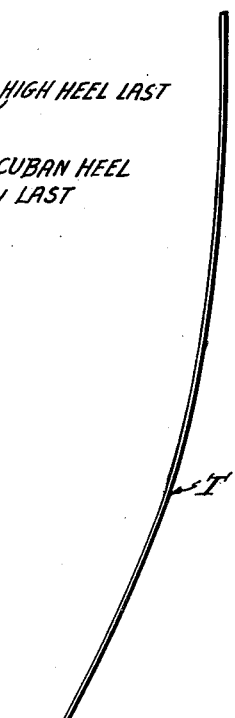
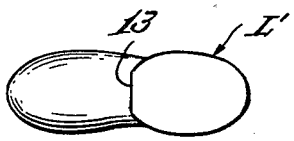
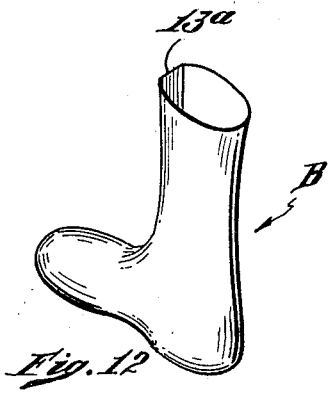

United States Patent Office 3,157,899
Patented Nov. 24, 1964

3,157,899
METHOD OF MAKING A BOOT LAST
George H. Bingham, Jr., Westminster, Md., assignor to Cambridge Rubber Company, Taneytown, Md., a corporation of Maryland
Filed June 28, 1961, Ser. No. 120,273
2 Claims. (Cl. 12—146)

This invention pertains to the manufacture of waterproof footwear, for instance, boots, bootees, gaiters, etc., for example, footwear of the kind in which a synthetic plastic is employed as a waterproofing medium, and relates more especially to a novel last for use in making such footwear, and to a method of making such a last—the present application being a continuation-in-part of co-pending application Serial No. 713,433, filed by George H. Bingham, Jr., on February 5, 1958, upon which Patent No. 3,099,862 issued August 6, 1963.

In the United States Letters Patent to Bingham, Jr., No. 2,957,188, dated October 25, 1960, there is disclosed a method of making a boot whose upper, at least, consists of synthetic resin and which has an opening extending downwardly from its top with a conventional slide fastener for closing the opening, said patent describing a novel method of uniting the tapes of such a fastener to the inner surface of the upper of the boot.

While the method disclosed in said application is much superior to any method which is known to be in commercial use, some difficulties have been experienced in the practice of said method: first, because the plastics employed in making such footwear have no adhesive qualities in the unfused state; and second, because the surface of the boot to which the fastener tapes are to be secured (in particular when the fastener is to be located at the front of the boot) is of non-uniform width and is curved both transversely and up and down to varying degrees of curvature, and since the fastener tape is not stretchable, it is very difficult to conform this tape to the inner surface of the boot top so as to insure a strong adhesion between the parts. When herein reference is made to a "tape," the term "tape" is to be understood (unless otherwise defined) as inclusive of a single length of tape or of the two parallel tapes comprised in a slide fastener.

A principal object of the invention is to provide a method of making a last, which is useful in the practice of the above process whereby it is made possible firmly to attach a tape or tapes (for example the tapes of a slide fastener) to the interior of a plastic boot upper by adhesive means and without recourse to the customary heat-sealing process. A further object is to provide means whereby a shoe upper may be so shaped, without detriment to its salable characteristics, as to facilitate the adhesive bonding of a tape or tapes to the interior of the boot upper. The resultant last may, if desired, be employed directly in making plastic boots by the dipping method, or which may be employed as a model in the making of a hollow mold for use in molding a plastic boot by the slush method, or a modification of the slush method.

Other and further objects and advantages of the invention will be pointed out in the following more detailed description and by reference to the accompanying drawings wherein:

FIG. 1 is a side elevation of a last embodying the present invention;

FIG. 1ª is a transverse section on the line 1ª—1ª of FIG. 1;

FIG. 2 is a front elevation of the last of FIG. 1;

FIG. 3 is a rear elevation of the last of FIG. 1;

FIG. 4 is a transverse section on the line 4—4 of FIG. 3.

FIG. 5 is a diagrammatic side elevation of a conventional last, for example one such as might be used in the manufacture of gaiter-type waterproof footwear;

FIG. 6 is a plan view of the last of FIG. 5;

FIG. 7 is a front elevation of the last of FIG. 5;

FIG. 8 is a diagram illustrating the preparation of a template representing the average curvature of lasts employed in the manufacture of boots or shoes of different types;

FIG. 9 is a diagrammatic view of a template so prepared;

FIG. 10 is a side elevation illustrative of one of many lasts, each having a front curvature like that of the template, for use in making boots of different styles.

FIG. 11 is a plan view of the last of FIG. 10; and

FIG. 12 is a diagramamtic perspective view illustrative of a shoe made upon a last like that of the present invention.

Referring to the drawings, the numeral 10 designates a boot last embodying the present invention. This last comprises the foot portion 11 and the leg portion 12. The foot portion of this last is of generally conventional construction, while its leg portion, as indicated in FIG. 4, is, as customary, more or less elliptical in transverse section, but, as herein illustrated, has areas 13 and 14 (FIG. 1a) at its front and rear respectively, which are approximately rectilinear in transverse section, although being curved heightwise of the last and, as here shown, are of substantial width, although it is within the purview of the invention that they may be of substantally zero width. These areas 13 and 14, at any horizontal plane of the leg portion of the last, are rectilinear so that these surfaces, as a whole, may be described in geometric terms as "cylindrically curved"—that is to say, each of the area 13 and 14 is such as is generated by the motion of a horizontal straight line in moving downwardly through space while always parallel to itself and while following a directrix line which may, as respects FIGS. 1, 2 or 3, be considered to be the center line of the usual conventional last at its forward or rear part respectively. Within such definition the directrix line may be of any curvature or even straight. When hereinafter this surface is referred to as of "cylindrical curvature," this term is to be interpreted in accordance with the above definition.

While it is possible to form these flat surfaces or areas 13 and 14 (FIG. 1a) by removing some of the material from a conventional last as, for example, by grinding, a preferred mode of procedure is to set into the substance of a conventional last at each of the desired locations, a ribbon-like strip 13a or 14a (FIG. 4), respectively of steel or other hard material, which has previously been shaped by conforming it to the edge of the template to the desired curvature. In setting the strips into the last, suitable channels would, of course, be formed, for instance, by a router or milling cutter of usual type, and the strips would be so set into the substance of the last proper that their exposed curved surfaces would merge smoothly with the adjacent portions of the original surfaces of the last proper so that the exposed faces of the strips would provide surfaces like the surfaces 13 and 14 of FIG. 1a.

In FIGS. 1 to 4, the last is shown as having such a cylindrical curved surface, both at front and rear, but it to be understood that the last may be provided with such a surface, either at front or rear, rather than having two such surfaces. The surface at the front of the last facilitates the application of a slide fastener at the front of the boot which is to be made on the last, while at the rear is particularly intended for use in applying a reinforce tape to the back of the boot.

In the practice of the method set forth in the aforesaid United States Letters Patent, No. 2,957,188, use is made of a clamping appliance which clamps the tape or tapes to the boot upper to insure firm contact of the parts at all points while they are being bonded together. At the forepart of the boot upper, where slide fasteners are customarily installed, the curvature is substantial and of varying radius heightwise of the boot upper, and varies with different styles and sizes of boot. In the development of the present invention, extended experiment was made to discover whether it would be practically possible to make lasts of different styles and sizes, but all having the same heightwise curvature at the front of the leg portion, thus, for example, reducing the number of different clamping devices necessary for the application of slide fasteners. With this in view, a number of conventional lasts were selected (those selected being lasts intended for use in making gaiter-type boots, since these are the most accurately designed of those employed in making waterproof footwear so far as fit is concerned). One of the lasts so selected was of a shape designed for use in making a gaiter with a flat heel—that is to say, one having a heel up to 1 inch in height; a second, for making a shoe having a Cuban heel—that is to say, one having a heel of from 1½ inches to 2 inches in height; and a third, for use in making shoes having a high heel—that is to say, for heels of from 2½ to 3 inches or higher. Such a conventional last as may be selected for the purpose is diagrammatically indicated at L in FIGS. 5, 6 and 7. Having selected these lasts, a center line C (FIG. 7) was scratched on the front of each last indicating the position at which the center of width of a slide fastener should be located on a shoe made on such a last. A profile was then made of the curve formed by this line, such profile having the shape of the forward edge of a vertical front-to-rear section of the last in the plane of its center line. These several profiles were superposed and from these a composite curve was drawn which was essentially the mean or average shape of the three profiles. A template was then prepared having an edge whose shape T was of this composite curve. When this template was placed in contact with lasts of various types and sizes, it was found that it would fit very closely to the fronts of lasts of many styles and including those designed for women's, children's, men's, boys' and youths' wear, and design for making shoes having heels of various heights. Having ascertained this fact, lasts such as last L' (FIGS. 10 and 11) of many styles and sizes were prepared, each at the front of its leg portion, having a cylindrically curved area, such as above referred to, having the heightwise curvature T' (FIG. 10) of the edge of the template, and it was found that it was practical, by the use of lasts so prepared, to carry out the process of the aforesaid Patent No. 2,977,188, in making a wide variety of boots, such as boot B' (FIG. 12) by the use of clamping appliances of a very limited number of sizes. Thus the present procedure, in making lasts, is very desirable from the commercial standpoint. It will be understood that when inserted steel strips, such as above referred to, are to be employed, their cylindrically curved outer surfaces will have the curvature of the edge of the template. Moreover, by making the curvature of the front surface of the leg of the boot last as above described, whether or not the practice of the process of said Patent No. 2,957,188 is contemplated, the manufacture of lasts is substantially simplified, since it is thus unnecessary in manufacturing lasts of all of the various sizes and styles required by the trade, to make the leg portions of all such lasts of corresponding different shapes.

While one desirable embodiment of the invention has herein been described by way of example, it is to be undertood that any and all modifications or equivalents thereof, which fall within the scope of the appended claims are considered as within the purview of the invention.

I claim:

1. That method of making a boot last which comprises as steps: providing a template whose edge is a curve which is a composite of the curves of the center lines of the leg portions of each of several selected conventional lasts of different styles and sizes, and, in making lasts of each of said several styles and sizes, shaping the front of the leg portion of each such last to conform to the curvature of the edge of said template.

2. That method of making a boot last having at the front of its leg portion a cylindrically curved surface which, at any transverse section, is approximately rectilinear, but which is curved heightwise of the last, said method comprising as steps: providing a template whose edge is a composite of the center lines of the leg portions of a plurality of conventional lasts of different styles and sizes, preparing ribbon-like steel strips, each of a width equal to that of the desired cylindrically curved surface of the last and each having a longitudinally curved face of a curvature like that of the edge of said template, and in making a last of any of said styles or sizes embedding such a steel strip in the front of the leg portion of the last so that its exposed curved face merges smoothly with the adjacent portions of the surface of the last proper.

References Cited by the Examiner
UNITED STATES PATENTS

| 1,320,202 | 10/19 | Chapman | 18—46 |
| 1,322,467 | 11/19 | Powell | 18—46 |
| 1,573,461 | 2/26 | Stone | 18—46 |
| 2,100,278 | 11/37 | Field | 12—139 |
| 2,264,003 | 11/41 | Osenberg | 264—238 |
| 2,460,874 | 2/49 | Coberly | 264—275 |
| 2,666,464 | 1/54 | Spencer | 12—146 |
| 2,786,007 | 3/57 | Chew | 154—83 |
| 2,834,987 | 5/58 | Teague | 18—41 |
| 2,887,726 | 5/59 | Vertin. | |

JORDAN FRANKLIN, *Primary Examiner*.

WILLIAM J. STEPHENSON, *Examiner*.